United States Patent [19]

Fuller et al.

[11] 4,110,728
[45] Aug. 29, 1978

[54] SEISMIC DATA PROCESSING APPARATUS FOR OBTAINING ALPHA VALUES FROM SEISMIC DATA

[75] Inventors: Lester R. Fuller, Pasadena; Herbert J. Meyer, Bellaire, both of Tex.

[73] Assignee: Texaco Inc., New York, N.Y.

[21] Appl. No.: 726,358

[22] Filed: Sep. 24, 1976

[51] Int. Cl.$^2$ .............................................. G01V 1/28
[52] U.S. Cl. .................... 340/15.5 DP; 340/15.5 CP; 340/15.5 F
[58] Field of Search ................ 340/15.5 DP, 15.5 CP, 340/15.5 A, 15.5 DS, 15.5 F

[56] References Cited

U.S. PATENT DOCUMENTS

| | | | |
|---|---|---|---|
| 3,622,965 | 11/1971 | Wu ................................ | 340/15.5 CP |
| 3,716,829 | 2/1973 | Ruehle ......................... | 340/15.5 DP |
| 3,899,768 | 8/1975 | Quay et al. .................... | 340/15.5 DS |

OTHER PUBLICATIONS

"Reflections on Amplitudes," Anstey and O'Doherty, Geophysical Prospecting, vol. 19, pp. 430–458, 1971.
"Method of Determination of Absorption Coefficient of Elastic Wave on Rock Models", V. P. Gorbatova, Razvedochnaia Geofizika, No. 26, 1968, pp.110–114.
"Method of Estimating the Absorption Decrement of Seismic Waves", A. B. Maksimov, Academia Nauksssr, Izvestiia Fizika Zemli, No. 6, 1965, pp. 65–71.

*Primary Examiner*—Howard A. Birmiel
*Attorney, Agent, or Firm*—Carl G. Ries; Thomas H. Whaley; William J. Beard

[57] ABSTRACT

It has been found that by treating seismic data as damped oscillatory responses of earth layers in the form of resonating layer bars of rocks, data values, termed alpha values, can be obtained which yield an indication of subsurface composition. Seismic data are accordingly processed by obtaining an indication of the frequency-amplitude spectrum of each successive portion or data window of a seismic trace, determining the half-power points of each such spectrum for the trace, obtaining from the half-power points the alpha value for each race and recording or plotting the alpha values. The alpha values obtained according to the present invention have been found to be useful in lithologic identification and in obtaining porosity information. The present invention is a calculator or digital data processing computer for obtaining such alpha values from field seismic data.

21 Claims, 9 Drawing Figures

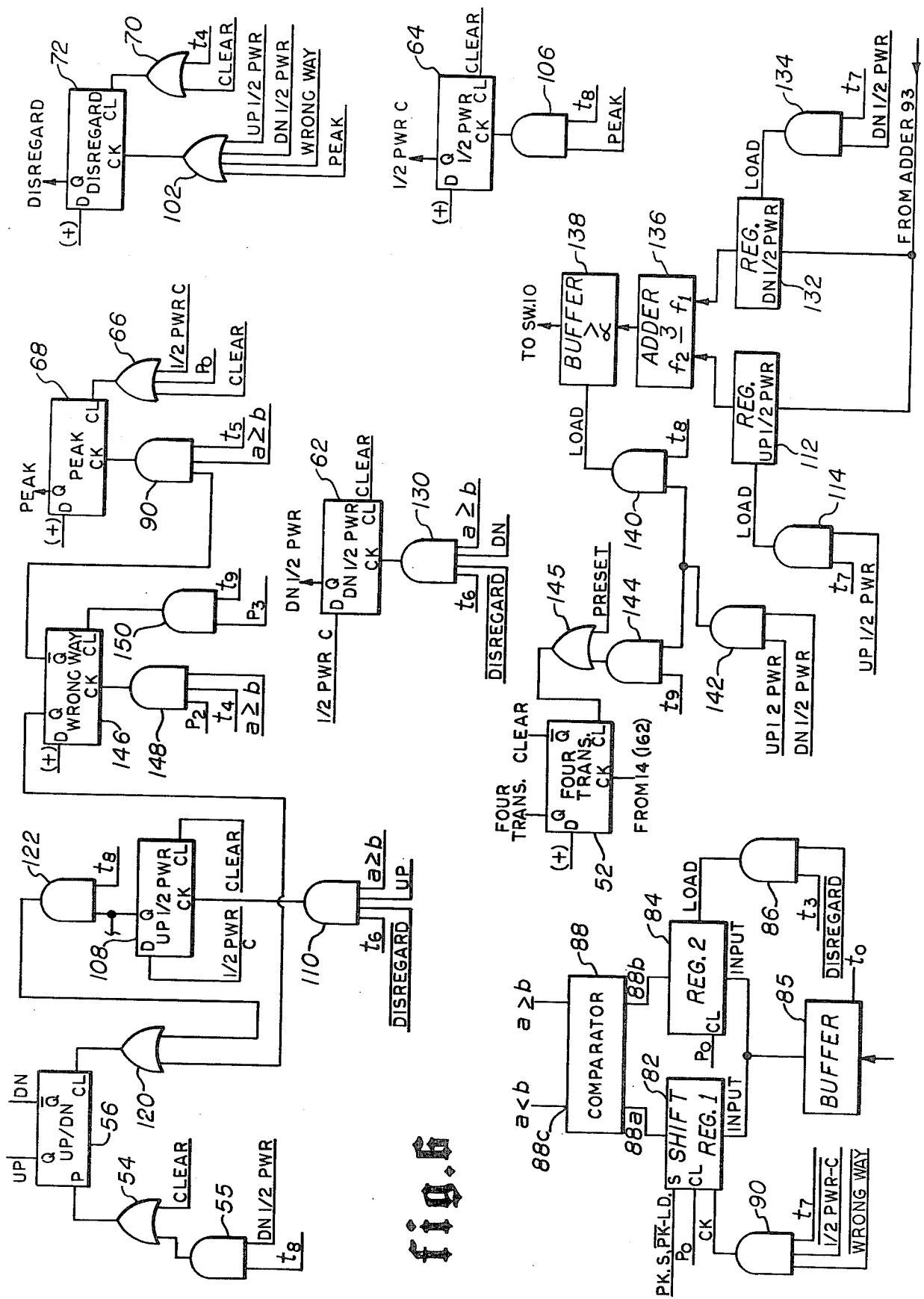

SEISMIC DATA PROCESSING APPARATUS FOR OBTAINING ALPHA VALUES FROM SEISMIC DATA

CROSS-REFERENCE TO RELATED APPLICATION

The present invention relates to processing field seismic data to obtain alpha values, as does U.S. patent application Ser. No. 725,804 (Texaco Docket No. D73,999), filed Sept. 23, 1976, which is incorporated herein by reference.

BACKGROUND OF THE INVENTION

1. Field of Invention

The present invention relates to seismic data processing.

2. Description of Prior Art

So far as is known, prior art seismic data have been processed and displayed in the form of variations in the amplitude of recorded seismic signals. However, even with the most sophisticated and advanced processing techniques, identification and characterization of lithology was often difficult to perform, and also frequently a subjective analysis.

SUMMARY OF INVENTION

With the present invention, it has been found that by treating seismic data as damped oscillatory responses of resonating layers or bars comprising the subsurface layers, data values termed alpha values can be obtained which give information as to subsurface composition.

Seismic data are processed in a calculator of the present invention to obtain these alpha values by obtaining an indication of the amplitude-frequency spectrum of successive data windows or time intervals along the seismic trace, determining the half-power points for each such frequency spectrum, and obtaining the alpha value from the difference between half-power frequencies, and displaying the alpha values so obtained.

The alpha values obtained according to the present invention are useful in lithologic identification and in obtaining porosity information. Small alpha values from narrow bandwidth frequency spectra in data windows are associated with layers which slowly attenuate seismic energy, while large alpha values, from wide bandwidth data windows, are associated with layers which more quickly attenuate seismic waves.

It is an object of the present invention to provide a new and improved calculator for processing field seismic data to obtain values useful in lithologic identification.

It is an object of the present invention to provide a new and improved calculator for processing field seismic data to obtain alpha values useful in lithologic identification.

BRIEF DESCRIPTION OF THE DRAWINGS

FIG. 5 is a digital logic circuit diagram of a calculator according to the present invention;

FIGS. 6 and 7 are digital logic circuit diagrams of a comparison and control circuit of the calculator of FIG. 5.

DESCRIPTION OF THE PREFERRED EMBODIMENT

TABLE OF CONTENTS

Section
I. PHYSICAL PRINCIPLES
II. METHOD OF DETERMINING ALPHA VALUES
III. SPECIAL PURPOSE COMPUTER IMPLEMENTATION

SECTION I. PHYSICAL PRINCIPLES

At the outset, an exploration of the physical principles involved in the present invention will be made to assist in an understanding of the present invention.

Figure 1:
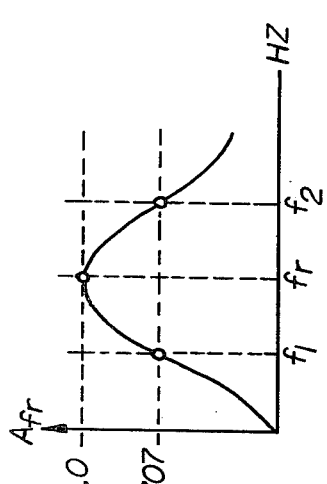
FIG. 1 is a frequency-amplitude spectrum of a seismic trace.

It has been shown in an article by Born, Geophysics, Vol. 6, No. 2, p. 132, April, 1941, that the frequency-amplitude characteristics of cylindrical bars fashioned from rocks can be measured in the laboratory. The bar can be said to act as a damped resonant system and the amplitude frequency resonance curve might typically appear as illustrated in FIG. 1.

Frequencies $f_2$ and $f_1$ are frequencies whose amplitude values are $1/\sqrt{2}$ of the resonant frequency $f_r$. The frequency shift between frequencies $f_2$ and $f_1$ manifests the bandwidth BW of the resonant system.

Bandwidth BW is defined as:

$$BW = 2\pi f_2 - 2\pi f_1 \qquad (1)$$

and furthermore:

$$BW = A_y C_y \qquad (2)$$

where $A_y$ = Young's modulus attenuation constant; and
$C_y$ = Young's modulus bar velocity.

Another commonly used quantity, Q, or sharpness of resonance, is expressed by:

$$Q = f_r/(f_2 - f_1) \qquad (3)$$

which for longitudinal resonance may also be related to the attenuation of Young's modulus waves by $$\frac{1}{Q_y} = \frac{A_y C_y}{\pi f_r} . \qquad (4)$$

Amplitudes $A_x$ of a longitudinally traveling wave measured one wavelength apart, $x$, in a bar are related to:

$$A_x = A_o \epsilon^{-A_y x} \qquad (5)$$

and upon substituting from Equation (4) above for $A_y$ $$A_x = A_o \epsilon^{-2(\pi f_2 - f_1) x/c_y} \qquad (6)$$

so that $$A_t = A_o \epsilon^{-2(\pi f_2 - \pi f_1)t} \qquad (7)$$

where it is seen that as a function of time, a constant designation according to the present invention as an alpha constant, $2(\pi f_2 - \pi f_1)$ is manifested by the bandwidth of the signal.

It has also been shown that if all appropriate bar constants are changed to bulk values, then the identical alpha constant applies to plane compressional and shear waves in bulk media.

For lumped constant systems, the amplitude of a decaying oscillation is expressed as:

$$A_t = A\epsilon^{-(\omega_2-\omega_1)t} \quad (8)$$

where A is a complex quantity. Thus, $$A_t = A\epsilon^{-2(\pi f_2-\pi f_1)t} \quad (9)$$

It is to be noted that for the lumped constant system, the alpha constant is also $2(\pi f_2 - \pi f_1)$ and is also a function of bandwidth.

With the present invention, it has been found that if seismic data are processed so that seismic traces are modeled as having an impulsive source and being a collection of damped oscillations emanating from resonating bars in the earth, wherein the signature of said oscillations contain bandwidth information, such data may be analyzed for alpha values which are useful in exploration for hydrocarbons and for other geophysical analysis.

SECTION II METHOD OF DETERMINING ALPHA VALUES

In the method of determining alpha values, the starting point is digital seismic data, which has been recorded broad-band. The data preferably has also been processed using conventional techniques so that it has been corrected for gain, spherical spreading and geometry, and so that the data is noise free (i.e., multiples, reverberations, bubble bounce signals, etc. are removed).

Because seismic data contain a multitude of overlapping events, only in rare instances may true alpha values be directly observed. However, it is possible to closely estimate these values by transforming the seismic data into the frequency domain. The estimated alpha values are then computed in the sequence set forth below.

Figure 2:
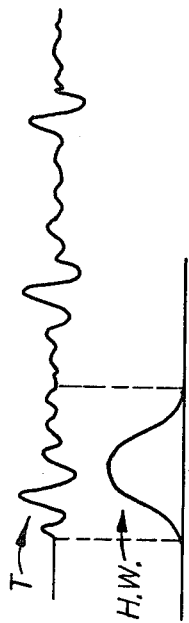
FIG. 2 is a typical seismic trace and a Hanning window section.

In FIG. 2 a seismic trace T is shown. A Hanning window HW, of pre-determined length is applied to a portion of data at the beginning of trace T. The length of the Hanning window is determined by observing the typical length of events on the trace (usually about 100 ms).

The Hanning window is applied to the data to obtain an estimate of the frequency-amplitude spectrum. Because of the overlapping nature of seismic events the Hanning function is best suited to produce a spectrum which appears to have come from a single event. It should be understood that other types of window functions or operators may be used, if desired.

The Fourier transform of the Hanned data is then determined. FIG. 1 illustrates an example of the general appearance of a Fourier transform spectrum so obtained. In this spectrum are certain characteristics which describe the true alpha, or $\alpha$ values which would be observed in the time domain if the seismic events were not overlapping in time.

The half-power values, $f_1$ and $f_2$, in the spectrum are then determined. The resonant or dominant frequency $f_r$ is determined. Should any one of these values be unavailable, the relation $$f_r^2 = f_1 f_2 \quad (10)$$

exists and the unknown may be obtained. The alpha value, $\alpha$, is obtained from the equation:

$$\alpha = 2\pi f_2 - 2\pi f_1 \quad (11)$$

The $\alpha$ value so found is then stored as an amplitude on magnetic tape and represents the $\alpha$ value estimate of the Hanned data window. The above process is repeated by moving the Hanning window down the seismic trace at a specified increment, and an alpha trace having all positive values is thus obtained.

Figure 3:
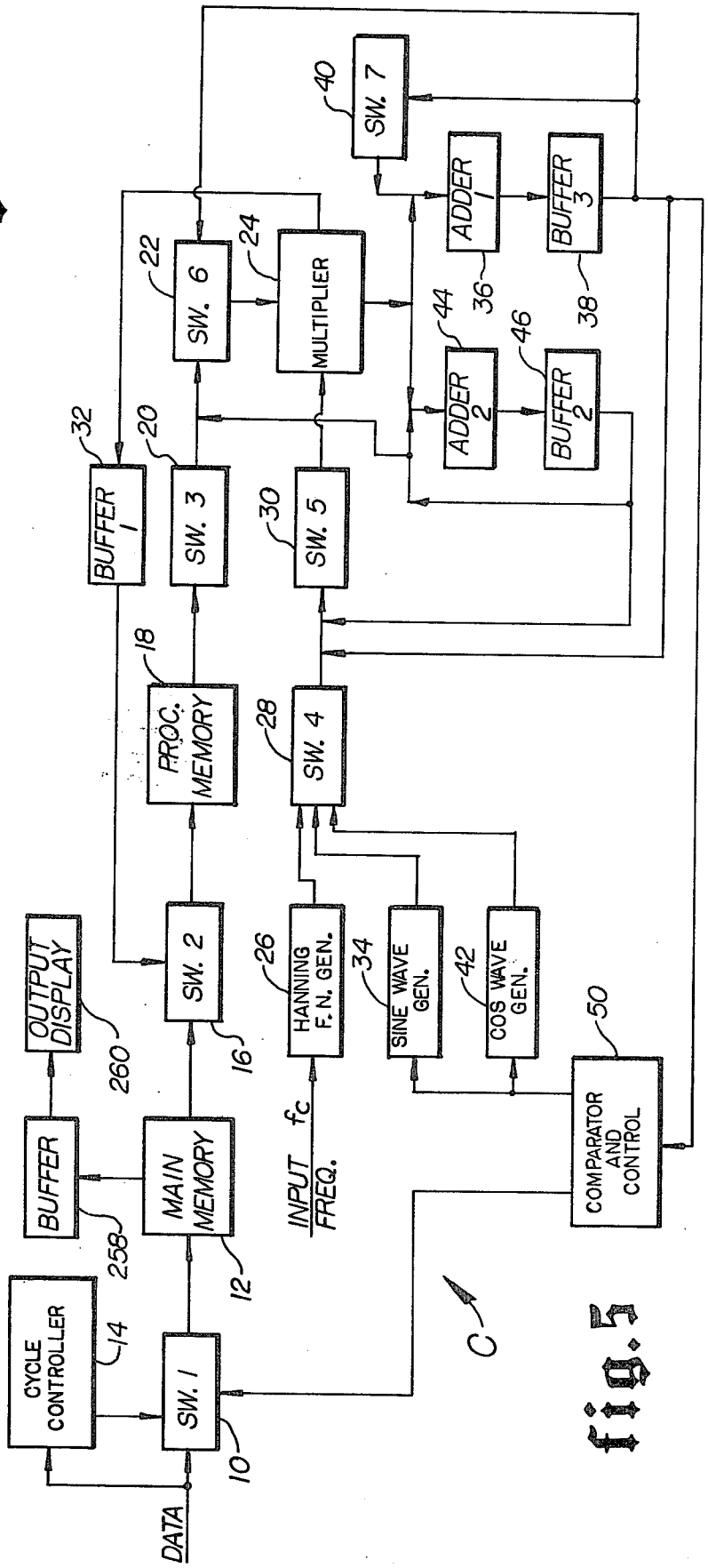
FIG. 3 is a conventional prior art amplitude section.
Figure 3:
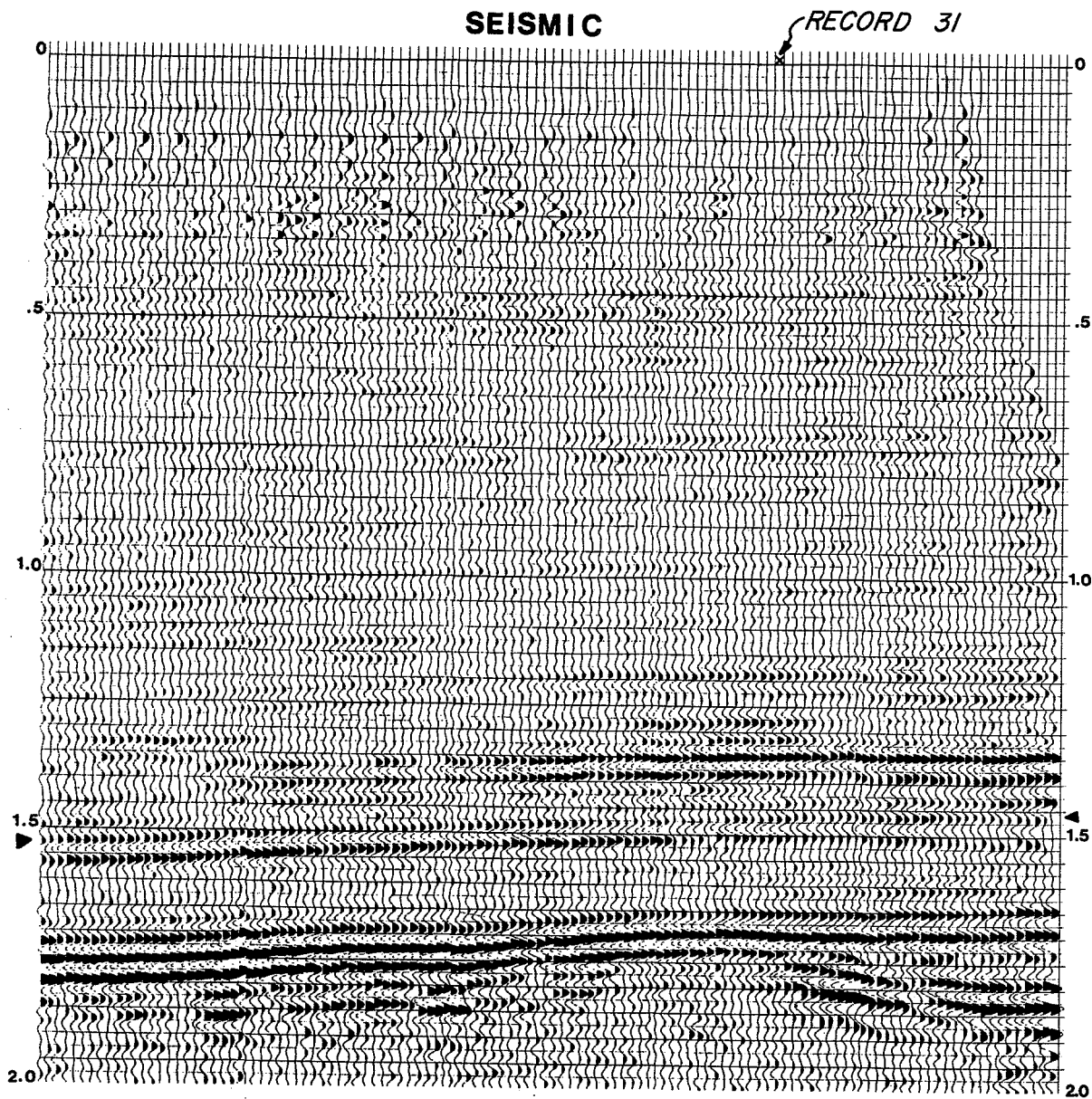

As an example of the potential inherent in the process of obtaining alpha values from seismic data, traces from an area where gas accumulations are present were processed. In FIG. 3, a conventional amplitude section and in FIG. 4 a section displaying alpha values are illustrated and so labelled. ALPHA processing started at 0.5 sec.. Also displayed in the ALPHA section is a sonic log which was obtained at the location labelled X on both sections. The sonic log was used to verify the validity of values. Where low sonic readings are noted (low velocity), high $\alpha$ values are expected, and vice-versa.

Figure 4:
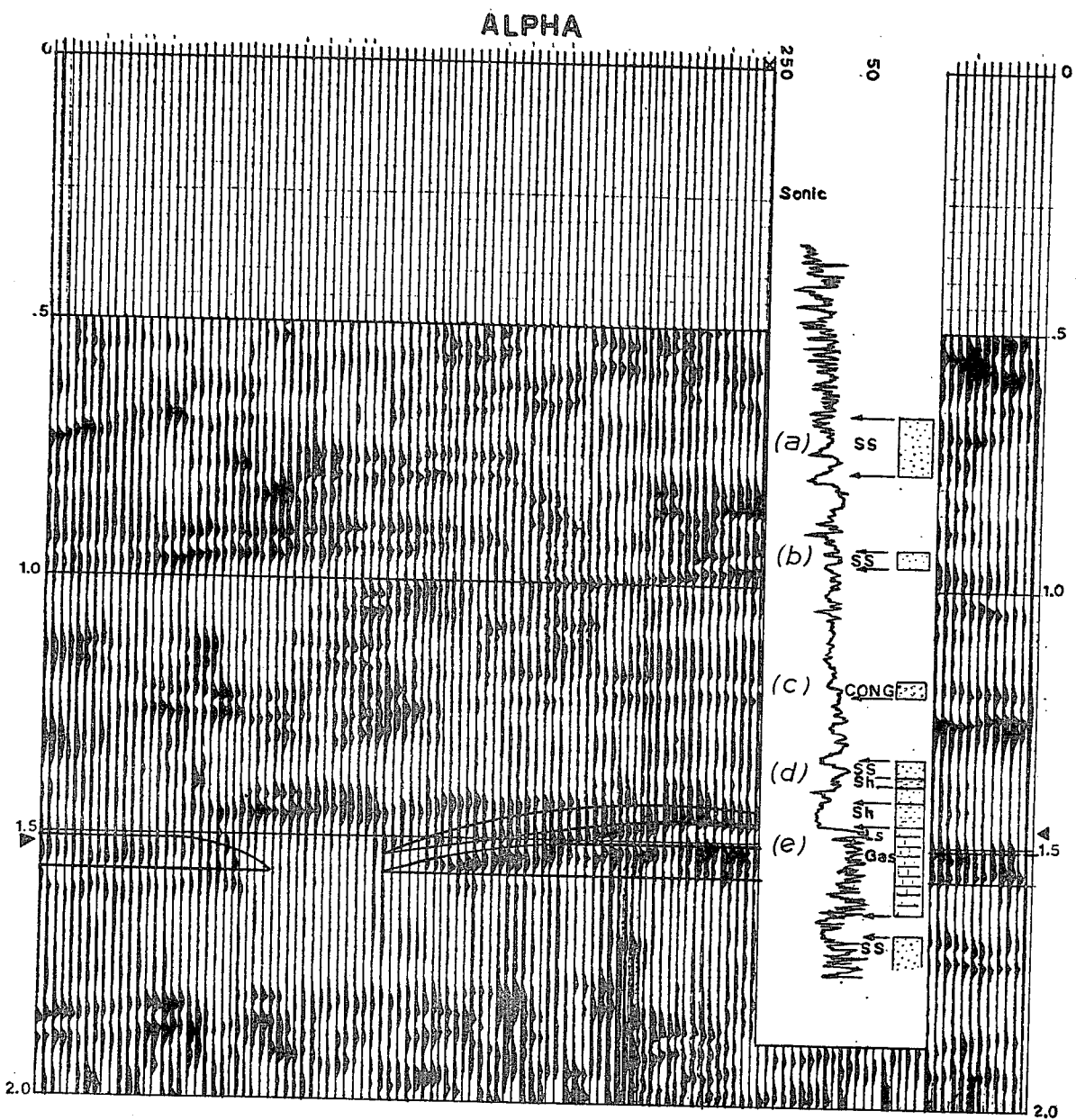
FIG. 4 is a display of alpha values from the seismic section of FIG. 3.

If the ALPHA section in FIG. 4 is viewed end-on, "hard" (limes, sands) streaks in the layers, of low $\alpha$ values, and "soft" (shale) streaks in the layers of high (dark) $\alpha$ values are readily apparent.

Several geologic horizons identified from cuttings and cores are noted next to their respective sonic readings. Shown in FIG. 4 are:

(a) Two white sandstones between 0.675 – 0.725 sec.
(b) A thin sandstone at 0.95 sec.
(c) A thin conglomerate at 1.2 sec.
(d) A soft shale between 1.425 – 1.46 sec.
(e) Limestone-sandstone sequence between 1.46 and 1.80 sec.

Of particular interest in FIG. 4 is the horizon (e). The limestone portion just below 1.46 sec. contains several porous zones with gas tests, including one at the shale-lime interface at 1.46 sec.. The estimated extent of the porous zones on either side of the well location can be drawn on the ALPHA section as so indicated by observing the anomalously high $\alpha$ values inside the lime layer. The top of this layer is noted on both sections by the triangles on either side of each section near 1.5 sec. The only sign that gas might be present on the SEISMIC section in FIG. 3 is the dim-out observed on Record 31 near 1.5 sec.. There is no gas-indicative response, known as a "bright-spot", associated with the gas test. However, the extent of a porous gas-tested zone is relatively easy to outline on the ALPHA section. If for instance it is known that a layered stringer of lime exists, yet some anomalous alpha values are noted inside the layer, it may be assumed that one is observing a change of porosity.

The sum of all the alpha values is related to a gain function which might be suited for gain compensation. It is envisioned that alpha-porosity tables (or charts) might be computed for the different earth materials. The same could be applied to density, etc. Also, there is a rather good inverse correlation between alpha values and velocity, and a relation may be mathematically formulated to tie these quantities together.

SECTION III SPECIAL PURPOSE COMPUTER IMPLEMENTATION

Figure 8:
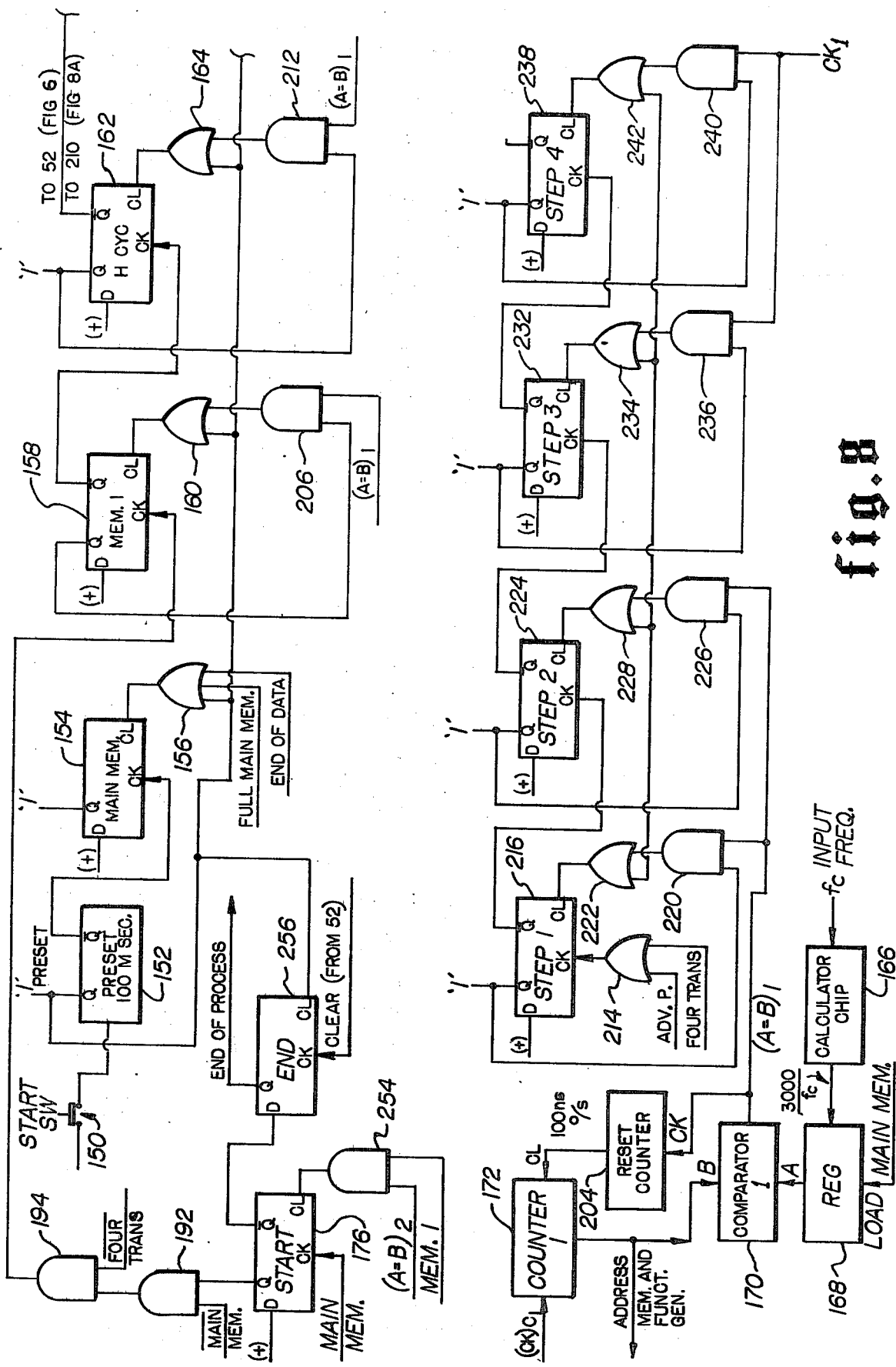
FIGS. 8 and 8A are digital logic circuit diagrams of a cycle control circuit of the calculator of FIG. 5.

In a special purpose digital computer or calculator C of the present invention (FIG. 5), input digital data in the form of seismic traces which have been recorded broadband and subjected to preliminary processing of the type set forth above, and amplitude normalization in the conventional manner, are read in through a digital switch 10 into a main memory unit 12. A cycle control unit 14 (FIGS. 5 and 8) controls the read-in of data into the memory 12 and the operation of the remaining circuits of the calculator C. The digital switch 10 and the remaining digital switches of the calculator C are conventional circuits, such as AND gates, which permit data present at one input to pass therethrough when a control signal is received from the cycle control unit 14.

As will be set forth in detail below, data bits of a length corresponding to the specified time window and transferred from the main memory unit 12 through a switch 16 to a process memory unit 18. The data bits in memory unit 18 are input data for a processing cycle and are multiplied by a Hanning function, subjected to Fourier transformation to obtain the frequency-amplitude spectrum, and the spectrum so obtained is analyzed to obtain the peak frequency $f_r$ and half-power frequencies $f_1$ and $f_2$. From the half-power frequencies, the bandwidth $f_2 - f_1$ is obtained, which when multiplied by a factor of $\pi$ yields the $\alpha$ value for the data window. The cycle control unit 14 provides timing signals to the remaining circuit components of the calculator C to route the data therethrough for each processing cycle.

A. MULTIPLY DATA BY HANNING FUNCTION

A first portion of the input digital data, corresponding in length to a desired time window is transferred from the main memory unit 12 through the switch 16 to the process memory unit 18 in response to signals from the cycle control unit 14. The digital data in the memory unit 18 is further transferred through switches 20 and 22 as a first input to a digital multiplier 24.

A Hanning function generator 26, a commercially available sine/cosine wave function generator, which generates an output signal in accordance with the Hanning function:

$$H(t) = \frac{1}{2} - \frac{1}{2} \cos \frac{2\pi t}{3T_c} \quad (12)$$

where $$0 \geq t \geq 3T_c \text{ and } T_c = \frac{1000}{f_c}, \quad (13)$$

receives an input signal representing the expected resonant frequency $f_c$ of the data window from a suitable digital input device. The Hanning function formed in the generator 26 based on the input signal representing the expected resonant frequency $f_c$ is transferred through digital switches 28 and 30 to the digital multiplier 24. The multiplier 24 multiplies the digital data from memory unit 18 by the Hanning function from generator 26 to form a signal $A_t$. The resulting signal $A_t$ from such multiplication is then stored in a storage buffer or register 32 and subsequently transferred into the memory unit 18 through the switch 16.

B. FOURIER TRANSFORMATION

After the input data window has been multiplied by the Hanning function in multiplier 24 to form the signal $A_t$ and returned through switch 16 to memory 18, the calculator C performs a Fourier transformation of the signal $A_t$ to obtain a function $A_f^2$ of the following form:

$$A_f^2 = ( \sum_{t=0}^{3T_c} A_t \sin \frac{2\pi t}{T_c} )^2 + ( \sum_{t=0}^{3T_c} A_t \cos \frac{2\pi t}{T_c} )^2 \quad (14)$$

STEP 1. Sine Product Formed. During the first step of the Fourier transformation, the data signal $A_t$ is furnished to the multiplier 24 through the switches 20 and 22. The sine function, $\sin 2\pi t/T_c$, is formed in a sine wave function generator 34, a conventional digital sine wave function generator. The sine function from the generator 34 is provided through switches 28 and 30 as a second input to the multiplier 24, which multiplies the signal $A_t$ by the sine function. The product formed in the multiplier 24 is then provided to an adder circuit 36, and the output of adder 36 stored in a buffer 38. The contents of the buffer 38 are provided as a second input to adder circuit 36 through a switch 40 to sum the products formed in multiplier 24.

STEP 2. Cosine Product Formed. During the second step of the Fourier transformation, the data signal $A_t$ is furnished to multiplier circuit 24 through switches 20 and 22. The cosine function, $\cos 2\pi t/T_c$, is formed in a cosine wave function generator 42, which is a conventional digital cosine wave function generator. The cosine function from the generator 42 is provided through switches 28 and 30 as a second input to multiplier 24, which multiplies the signal $A_t$ by the cosine function. The product formed in the multiplier 24 is then provided to an adder circuit 44, and the output of adder 44 is stored in a buffer 46. The contents of buffer 46 are also provided as an input to the adder circuit 44 to sum the products formed in multiplier 24.

STEP 3. Squaring the Result of STEP 1. During the third step of Fourier transformation, the sum of products of the signal $A_t$ and the sine function, stored in the buffer 38, is returned through switches 22 and 30 to both inputs of the multplier 24, which thereby squares such product function. The squared result is transferred to one input of the adder 36, while the other input of the adder 36 receives a zero value input signal through the switch 40 in response to a control signal from cycle controller 14. Addition of this zero value to the squared output product function of multiplier 24 and adder 36 results in the squared product function being stored in buffer 38.

STEP 4. Summing to Obtain $A_f^2$. During the final step of Fourier transformation, the sum of products of the signal $A_t$ and the cosine function, stored in the buffer 46, is returned to both inputs of the multiplier 24 through the switches 22 and 30, squaring such cosine product function. The squared result from the multiplier 24 is transferred to one input of the adder 36, while the contents of buffer 38, representing the squared sine product function are transferred to the input of adder 36 through the switch 40 in response to a signal from controller 14. The output of adder 36 thus represents the Fourier transformation function $A_f^2$, which is transferred into the buffer 38.

C. COMPARISON AND CONTROL CYCLE

A comparison and control circuit 50 of the circuit C (FIGS. 5 through 7) which operates during the Fourier transformation compares the amplitude functions $A_f^2$ from the buffer 38 beginning with the expected center frequency $f_c$ and for successively incremented frequency values to detect both the resonant or peak frequency $f_r$ and the half-power frequencies $f_1$ and $f_2$.

As a labelling convention in the comparison and control circuit 50 and the cycle control unit, the flip-flops therein are of the type known as "D" flip-flops and will be called indicators. Each of such flip-flops has a D input, a clock input CK, a preset input P and a clear input CL, as well as a Q output and a $\bar{Q}$ output. When a logic "0" to logic "1" level change appears at the clock input CK and the D input is logic "1", the flip-flop will set to a "1" logic level at the Q output and to a logic "0" level at the $\bar{Q}$ output. When "0" to "1" logic level change appears and the D input is "0", the $\bar{Q}$ output goes to the "1" level while the Q output goes to the "0" level. The presence of a logic "1" at the P input forces the $\bar{Q}$ output to a logic "1" and the $\bar{Q}$ output to a logic "0" regardless of the D and CK inputs. Conversely, the presence of a logic "1" at the CL input forces the $\bar{Q}$ to a logic "1" and the Q output to a logic "0".

It should be understood, however, that other types of digital logic registers or flip-flops may be used, if desired.

As a connector convention, due to the numerous connections of timing signals with other components of the calculator C as well as between the various circuit components of the circuit 50, individual conductors performing these connecting functions are not shown in the drawings in order to maintain clarity in the drawings. Rather, the output of a circuit component is given an identifying label and inputs of other circuits receiving such a signal are given like identifying labels. For example, in the comparison and control circuit 50, a FOURIER TRANSFORM indicator 52 (FIG. 6) receives an input signal from an indicator 162 of the cycle control unit 14 at a CK input, driving the Q output thereof to logic "1". The output from the indicator 52 is provided over a conductor labelled CLEAR through an OR gate 54 to a P terminal of an UP/DOWN indicator register 56, driving a Q or "UP" output to a logic "1" and a DOWN output $\bar{Q}$ to logic "0". The CLEAR output signal from indicator 52 is also provided to a t counter 58 (FIG. 7) and a P counter 60, resetting the counts therein to zero. The CLEAR signal from the indicator 52 is also provided to the CL input terminals of a DOWN HALF-POWER indicator 62 (FIG. 6), a HALF POWER CYCLE indicator 64 and an UP HALF-POWER indicator 108 driving the Q outputs thereof to logic "0". The CLEAR signal from the indicator 52 is also provided through an OR gate 66 to a PEAK cycle indicator 68 at a CL input thereof, driving the Q output, labelled PEAK, to a logic "0". Also, the CLEAR output from indicator 52 is provided through an OR gate 70 to a DISREGARD indicator 72. In this manner, upon receipt of a signal from the cycle control unit 14 in the comparison and control unit 50, the timing counters 58 and 60 are reset to zero, the UP/DOWN indicator 56 is reset to indicate that counting should be in the upward direction; the PEAK cycle indicator detector is set to zero where it will remain until the peak frequency is found; the UP HALF-POWER and the DOWN HALF-POWER indicator are set to zero since such will not be the first comparison cycles to be performed; the DISREGARD indicator is set to zero so that comparison results will not be disregarded; and the HALF-POWER cycle indicator 64 is set to zero since the first operation of the comparison circuit 50 is to determine the peak frequency $f_r$.

The timing cycle counter circuit or t counter 58 (FIG. 7) is a digital counter forming output count signals $t_0$ through $t_9$ at designated output terminals thereof, forming ten equal time intervals $t_0$ through $t_9$. The $t_9$ output of the counter 58 is provided to the P counter circuit 60 which is a large capacity digital counter, for example 256 counts or larger, forming output count signals $P_0$ through $P_k$, indicating the number of processing cycles of the calculator C, each composed of ten equal time intervals $t_0$ through $t_9$.

FIRST CYCLE $P_0$

During the period when the counter 60 is providing $P_0$ as an output signal, an UP/DOWN counter 78 (FIG. 7) is set to zero at the CL input through an OR gate 80. The counter 78 counts upwardly in response to a logic "1" signal at a count control input terminal 78a from the UP/DOWN indicator 56 (FIG. 6). For each cycle thereafter, the counter 78 increments the count upwardly on receipt of the timing control signal $t_0$ from the counter 58 at a CK input. The output of counter 78, representing the number of increments to the input frequency $f_c$ is also provided to function generators 34 and 42 (FIG. 5) as will be set forth. During the cycle $P_0$ storage registers 82, 84 and indicator 68 through OR gate 66 (FIG. 6) are cleared as well. Concurrently during the cycle $P_0$, the value $A_f^2$ is computed in the calculator C and stored in the buffer 38 (FIG. 5) in the manner set forth above.

SECOND CYCLE $P_1$

Figure 7:
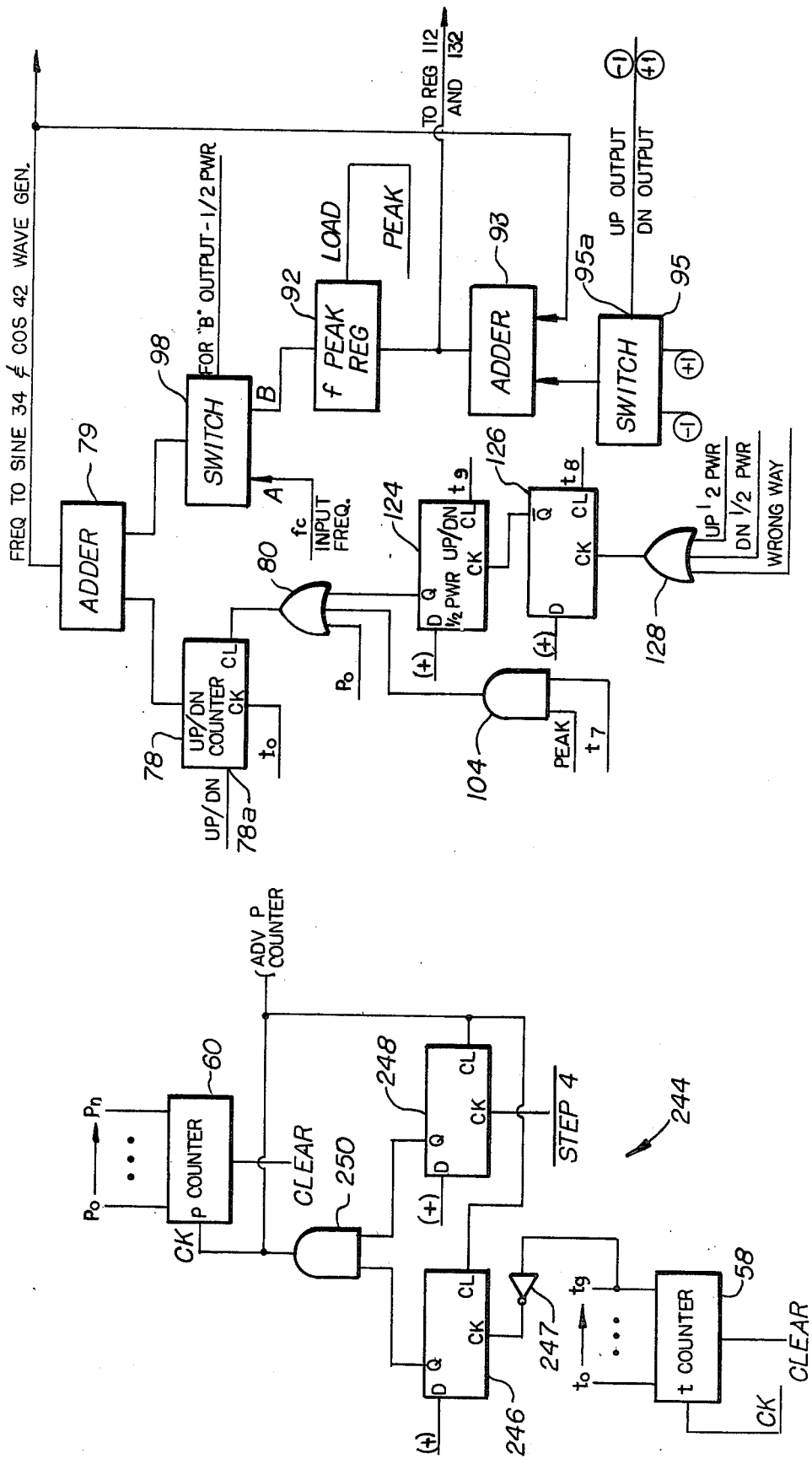

During the first time interval $t_0$ of cycle $P_1$, and for cycles thereafter the counter 78 is advanced by one (FIG. 7). Also, the buffer register 85 is energized to receive the contents $A_f^2$ from the first cycle $P_0$ for the expected frequency $A_{f_c}$ from buffer 38.

During the time interval $t_3$ of the cycle $P_1$ and for cycles thereafter, register 84 is energized at a load input terminal by an AND gate 86, reading the value $A_f^2$ in buffer 85 into the register 84 as well. A comparator 88 compares the amplitude of the contents of register 82 and 84 at this time. Since the register 82 was cleared during the first cycle $P_0$ and has received no further data, the signal presented at an input terminal 88a is less than the signal present at input terminal 88b to the comparator 88 and the comparator 88 forms an output signal with a logic "1" level at an output terminal 88c indicating that the contents of register 82 are less greater than the contents of register 84.

At the time interval $t_7$ of cycle $P_1$ and for cycles thereafter, the register 82 is energized through an AND gate 90 transferring the contents from the register 85 into the register 82 for the next comparison cycle.

THIRD CYCLE $P_2$

During the time interval $t_0$ of the third cycle $P_2$, the counter 78 is incremented again by one and the register 85 receives the contents $A^2_{f_c+1}$ from the buffer 38. During the time interval $t_3$, the register 84 is loaded with the contents of the register 85, and the contents of registers 82 and 84 are compared in the comparator 88.

Two situations can exist as a result of the comparison in the comparator 88: CASE ONE, where the contents of register 82 are less than the contents of register 84, and CASE TWO, where the contents of register 84 equal or exceed the contents of register 82. CASE ONE will be discussed first, with CASE TWO set forth thereafter.

CASE ONE 1. Detect Peak Frequency

If the comparison results during time cycle $P_2$ indicate that the contents of register 82 are less than the contents of register 84, the amplitude function $A_{f_c+1}{}^2$ exceed the previous amplitude function $A^2{}_{f_c}$ for the expected resonant frequency $f_c$. Accordingly, for each further cycle $P_i$, during $t_0$, the counter 78 is incremented by one, and the contents $A^2$ of buffer 38 for the new frequency $F_{c+i}$ are transferred into the register 85 during the time interval $t_0$. Further, the newly incremented contents of counter 78 are summed with the input frequency $f_c$ in an adder 79 and provided to function generators 34 and 42.

During the time interval $t_3$, register 84 is loaded with the contents of the register 85, and a comparison made in the comparator 88. Finally, during the time interval $t_7$, the register 82 is loaded with the contents of the register 85 for the next succeeding comparison cycle. At some time interval $P_n$ for a particular frequency $f_{c+n-1}$, the comparator 88 determines that the content of the register 82 equals or exceeds the content of the register 84. During such cycle, the comparator 88 at the time interval $t_5$ energizes the PEAK INDICATOR flip-flop 68 through an AND gate 90. At this time, a PEAK FREQUENCY register 92 (FIG. 7) is energized to load therein the contents of an adder 93. Adder 93 sums the contents of the adder 79 with a plus or minus one from a switch 95. The switch 95 is controlled through a control input 95a by the UP/DOWN indicator 56 to provide minus one for UP and plus one for DOWN.

The adder 79 sums the count output from the counter 78 with the designated input frequency $f_c$ selected by the operator and provided thereto in the manner that such signal is provided to the Hanning function generator 26 as set forth above. The contents of adder 93 thus represent the sum of the designated input frequency $f_c$ and the number $n-1$ of increments required to reach the frequency $f_r$, where the peak amplitude function $A_{f_r}{}^2$ was detected in the comparator and control circuit 50. Finally, the DISREGARD indicator 72 (FIG. 6) is enabled at its clock input through OR gate 102 so that the next comparison cycle will be disregarded by exhibiting AND gate 86. This disregard signal is provided at the time the peak is detected, since it is known that the next subsequent comparison will be meaningless and should be disregarded.

During the time interval $t_7$ of cycle $P_n$ when the peak amplitude function is detected, an AND gate 104 (FIG. 7) is energized by the PEAK indicator 68, resetting the counter 78 to zero through the OR gate 80.

Since the peak amplitude function $A^2{}_{f_r}$ has been detected, it is now necessary to search for the half-power frequencies $f_1$ and $f_2$ in comparator and control circuit 50. Accordingly, the amplitude function $A^2{}_{f_r}$ stored in register 82 is divided in half. This function is performed by the presence of the PEAK signal from indcator 68 at a shift input terminal S of register 82 and the presence of the timing signal $t_7$ at the clock input terminal through AND gate 90.

During time interval $t_8$, the HALF-POWER CYCLE indicator 64 is energized at the CK input thereof by the simultaneous presence of the peak indicator signal and the time interval $t_8$ at inputs of an AND gate 106. At this time, the Q output of the indicator 64 is driven to a "1" level, clearing the peak indicator 68 through the OR gate 66. The HALF-POWER CYCLE indicator controls switch 98 (FIG. 7). For "0" output from the HALF POWER indicator switch 98 will transfer $f_c$ to adder 79. For logic "1" output from the HALF POWER indicator switch 98 will transfer $f_r$ from register 92 to adder 79.

During the next cycle $P_{n+1}$ after detection of the frequency having the peak amplitude in the spectrum, during the time cyle $t_0$, the counter 78 is advanced by a count of one, and during the time interval $t_4$, the DISREGARD indicator 72 is set to zero through the OR gate 70.

During the second cycle $P_{n+2}$ after detection of the peak amplitude, during the time interval $t_0$ the counter 78 is advanced by one, and during the time cycle $t_3$ the register 84 is loaded with the contents of the register 85. The comparison is then performed in the comparator 88 which compares the amplitude function $A^2{}_{f_r}$ with the halved value of the peak amplitude function $A^2{}_{f_r}/2$ stored in register 82.

DETECT UPPER HALF POWER FREQUENCY $f_2$

Succeeding operating cycles $P_{n+i}$ continue with the counter 78 being advanced one during the time interval $t_0$, the register 84 loaded with the contents of register 85 and comparison taking place in comparator 88 during the time interval $t_3$ until the comparator 88 indicates that the contents of register 84 equal or exceed the contents of register 82. During the cycle $P_{n+m}$ when this occurs, an UP ONE-HALF POWER indicator 108 is energized at the clock input terminal through an AND gate 110, provided that the indicator 56 indicates than an up count is being performed, the proper output is received from the comparator 88, and the DISREGARD indicator is disabled, and time interval $t_6$.

Again, since the next comparison cycle is meaningless, the DISREGARD indicator 72 is now energized by the output of the indicator 108 through the OR gate 102. At that time, indicator 126 is energized from indicator 108 through OR gate 128.

During the time interval $t_7$, the output of the indicator 108 energizes and UPPER HALF-POWER register 112 through an AND gate 114, causing the contents of the adder 93 (FIG. 7) to be transferred and stored in the buffer 112. The output from the adder 93 stored in the buffer 112 represents the upper half frequency count $f_2$ obtained from the adder 79 after the contents of adder 93 are decreased by $-1$ by an input from switch 95 in the manner set forth above.

During the time interval $t_8$ of the cycle $P_{n+m}$, the indicator 56 is energized through an OR gate 120 and an AND gate 122 from the indicator 108, causing the indicator 56 to now indicate "0" at the Q output and "1" at the $\bar{Q}$ output. Further at $t_8$, indicator 126 is set to "1" at its $\bar{Q}$ side causing the ½ POWER UP/DOWN indicator 124 (FIG. 7) to be energized. Energization of the indicator 124 causes the counter 78 to be reset to zero through the OR gate 80. During the next succeeding time interval $t_9$, the indicator 124 is reset to zero at its CLEAR input by the timing signal $t_9$.

DETECT LOWER HALF POWER FREQUENCY $f_1$

During the next operating cycle $P_{n+m+1}$, the counter 78 is advanced by a $-1$, since the indicator 56 now indicates that a down count is being made. Accordingly for the time interval $t_0$ for each succeeding cycle, the counter 78 is advanced by −1. During the time inteval $t_4$ of cycle $P_{n+m+1}$, the DISREGARD indicator 72 is again reset through the OR gate 70.

During the cycle $P_{n+m+2}$, the counter 78 is again advanced by −1, and the register 85 loaded with the contents from the buffer 38. During the time interval $t_3$, the register 84 is loaded with the contents of the register 85 and a comparison performed in the comparator 88. The operating cycles continue until a time operating cycle $P_{n+m+j}$ when the comparator 88 indicates that the contents of the register 82 equal or exceed the contents of the register 84 during the time interval $t_3$.

During the time interval $t_6$ of this cycle, the DOWN ONE-HALF POWER indicator 62 (FIG. 6) is energized through an AND gate 130, thereby energizing the DISREGARD indicator 72 through the OR gate 102.

During the time interval $t_7$ of the cycle when the lower half power frequency $f_1$ has been found, as evidenced by the output from the comparator 88, a buffer 132 is energized by an AND gate 134, causing the contents of the adder 93 (FIG. 7), representing the lower half power frequency $f_1$, to be stored in the buffer 132. The contents of the buffers 112 and 132 are provided as inputs to an adder 136 which subtracts the lower half power frequency $f_1$ from the upper half power frequency $f_2$.

During the next time interval $t_8$, a buffer 138 is energized through AND gates 140 and 142, causing the output of adder 136 which when multiplied by a scaling constant is the value of alpha, $\alpha$, to be stored in the buffer 138. Additionally, the indicator 124 (FIG. 7) is energized through indicator 126 and OR gate 128, and the counter 78 thereby reset to zero through the OR gate 80. During the time interval $t_9$, the indicator 52 is cleared through an AND gate 144, AND gate 142 and OR gate 145, indicating that an alpha value has been determined for the particular data window. At this time, the cycle controller unit 14 receives an output signal from the indicator 52 in a manner to be set forth and causes the contents of the register 138 in the comparator and control circuit 50 to be transferred to the main memory 12 through the switch 10.

Another data window is then called from the main memory 12 and transferred to the processing memory unit 18 for application of the Hanning function thereto and the preceding cycle set forth above again takes place for each succeeding data window.

CASE TWO

The second operating condition is CASE TWO, where operations through the third cycle $P_2$, time interval $t_3$, take place in a like manner to CASE ONE. However, in case two, the output of the comparator 88 at this time interval indicates that the contents of register 82 equal or exceed the contents of register 84, indicating that the frequency spectrum must be scanned for decreasing rather than increasing frequency values to detect the peak frequency $f_r$, and accordingly that frequency incrementing operations need to be reversed.

Accordingly, during the next time interval $t_4$ of the cycle $P_2$, a WRONG WAY indicator 146 (FIG. 6) is energized through an AND gate 148, causing the indicator 56 to be set through the OR gate 120 to indicate a down count, and energizing the DISREGARD indicator 72.

During the time interval $t_8$ of the cycle $P_2$, the counter 78 (FIG. 7) is reset to zero through OR gate 80, indicator 124, indicator 126 and OR gate 128.

During the next operating cycle $P_3$, the counter 78 is advanced by −1, due to the count direction input from indicator 56, and the register 85 loaded with the contents of the buffer 38.

During the time interval $t_4$, the DISREGARD indicator 72 is cleared. During the time interval $t_9$ of the cycle $P_3$ the WRONG WAY indicator 146 is cleared through an AND gate 150.

During the next operating cycle $P_4$, the counter 78 is advanced by −1, and the contents of buffer 38 transferred into the buffer 85. During the time interval $t_3$ of this operating cycle, the contents of buffer 85 are stored in register 84, and a comparison performed in the comparator 88 between the contents of register 82 and 84. So long as the contents of register 82 are less than the contents of register 84, during the time interval $t_7$, the contents of register 85 are transferred into register 82, and another operating cycle performed for the frequency advanced again by −1 by the counter 78. Comparison operations in this manner scanning downwardly in the frequency spectrum continue until a time $P_n$, when the comparator 88 indicates during the time interval $t_3$ that the contents of register 82 equal or exceed the contents of register 84, indicating that the peak frequency $f_r$ has been detected. At this time, the PEAK indicator 68 is energized through the gate 90, the register 92 (FIG. 7) is caused to load the contents of the adder 93 therein and the DISREGARD indicator 72 energized.

During the time interval $t_7$, the counter 78 is set to zero, and the contents of register 82 divided in half by being shifted one bit to the right in the manner set forth above. During the next time interval $t_8$, the HALF-POWER CYCLE indicator 64 is set to one through the AND gate 106.

After the peak frequency $f_r$ has been found in the comparator and control circuit 50 during the CASE TWO operations, location of the half-power frequencies $f_1$ and $f_2$ is then performed in a like manner to processing steps of CASE ONE set forth above, however, the DOWN HALF-POWER frequency is detected first. Once the DOWN HALF-POWER frequency is detected, time interval $t_8$ will set indicator 56 to UP direction through OR gate 54 and AND gate 55. The UP HALF-POWER frequency will now be searched for.

D. CYCLE CONTROLLER 14

Figure 8A:
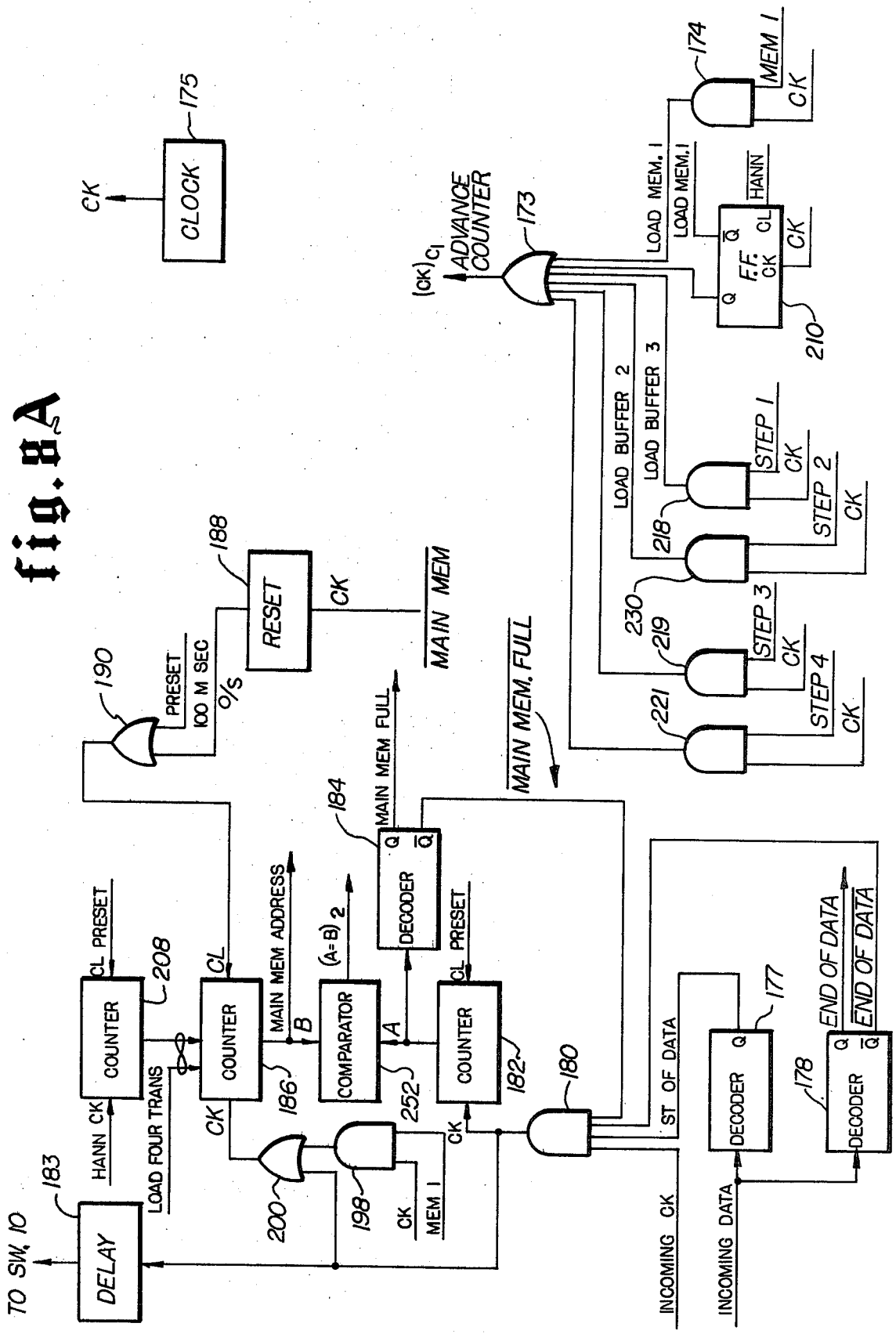

In the cycle controller 14 (FIGS. 8 and 8A), a START switch 150 (FIG. 8) is depressed by an operator to begin processing operations of the calculator C. A PRESET MACHINE monostable multivibrator, or one-shot, 152 forms a logic "1" output pulse of suitable duration, for example, 100 msec., in response to depression of the switch 150. The pulse from the one-shot 152 clears a MAIN MEMORY indicator 154 through an OR gate 156, a MEMORY 1 indicator 158 through an OR gate 160, and a HANNING CYCLE indicator 162 through an OR gate 164, as well as other components of control unit 14 to be set forth as indicated as inputs thereof.

After the expiration of the one hundred msec. pulse from the one-shot circuit 152, the MAIN MEMORY indicator 154 Q output is set to "1" by the $\overline{Q}$ output from one-shot 152, indicating that the calculator C is operating in the MAIN MEMORY cycle, transferring data into the main memory 12 through the switch 10. A calculator chip 166 receives input signals representing the expected resonant frequency, $f_c$, in a like manner to Hanning function generator 26 in the manner set forth above, and forms an output signal representing the value $3000/f_c$, representing the time length of the Hanning window function, which is stored in a register 168 in response to a "1" output from the MAIN MEMORY indicator 154. A START indicator 176 is also set to "1" by a logic "1" from the Q output of MAIN MEMORY indicator 154.

The calculator C is now ready for receipt of external data from a suitable digital memory. Incoming data are provided to a DECODER circuit 177 (FIG. 8A) and a DECODER circuit 178 in the cycle controller 14, as well as the switch 10 during read-in to the memory 12. The DECODER circuit 177 detects a code in the incoming data signal indicating START of DATA in such signals and activates an AND gate 180 so that clock or synchronization pulses in each data word of the incoming signal are counted in a counter 182, which thus counts the number of data words in the incoming data. The incoming clock pulses in the data through AND gate 180 are also provided to a suitable time delay circuit 183 which compensates for processing delays, and therefrom to switch 10 to cause the incoming data to be read through the switch 10 to the main memory 12. The clock pulses from gate 180 are also provided through OR gate 200 to counter 186. Counter 186 counts up and provides address locations for the incoming data in the main memory 12.

A decoder 184 (FIG. 8A) compares the output count of the counter 182 with a digital number stored therein, representing the storage capacity of the memory 12 and sends a FULL MAIN MEMORY signal to OR gate 156 (FIG. 8) and also a $\overline{\text{FULL MAIN MEMORY}}$ signal to disable AND gate 180. DECODER circuit 178 (FIG. 8A) detects a code in the incoming data signal indicating END OF DATA in such signals and sends an END OF DATA signal to OR gate 156 (FIG. 8) and also an $\overline{\text{END OF DATA}}$ signal to disable AND gate 180. Accordingly, when either the memory unit 12 is filled with data, or all input data but less than the storage capacity of unit 12 have been stored OR gate 156 (FIG. 8) will set the MAIN MEMORY indicator 154 to logic "0" and also disable counter 182 through an AND gate 180.

A counter 186 is reset at this time through a oneshot 188 and an OR gate 190 in response to transition of the MAIN MEMORY indicator 154 output to logic "0". An AND gate 192 (FIG. 8) at the output of the START indicator 176 is driven to a "1" and an AND gate 194, connected to the output of the gate 192 and to the $\overline{Q}$ output of the FOURIER TRANSFORM indicator 52 in the cycle control of 50 (FIG. 6) is then energized since the Fourier transform cycle has not yet begun. AND gate 194 thus drives MEMORY 1 indicator 158 to "1", indicating that transfer of a time window of data from the memory unit 12 to the process memory unit 18 is to take place. The counter 172 (FIG. 8) is advanced by one through the gates 173 and 174 (FIG. 8A), and such count is provided as an address indicator signal to the processing memory unit 18 and the function generator 26. The counter 186 is advanced by 1 through an AND gate 198 and an OR gate 200 by clock pulses from the clock 175, and the count contents of the counter 186 are provided as a main memory address signal to the main memory unit 12. Counting and addressing continues in this manner until the contents of the counter 172 (FIG. 8) equal the number stored in the register 168 indicating the length of the HANNING window, as detected by the comparator 170.

At this time, a RESET COUNTER one-shot 204 (FIG. 8) is energized by the comparator 170, forming an output pulse which clears counter 172 of its contents and resets the counter 172 to zero. The output signal from the comparator 170 is also provided at this time to an AND gate 206 to clear the MEMORY 1 indicator 158 through the OR gate 160, thereby energizing the HANNING CYCLE indicator 162.

The counter 186 is then cleared and a counter 208 (FIG. 8A), whose contents thus indicate the number of data windows to which the Hanning function has been applied, is advanced by one. A "0" output of the $\overline{Q}$ side of the HANNING CYCLE indicator 162 at the start of the HANNING CYCLE also removes the signal which has been provided to clear an indicator 210 (FIG. 8A) and thus removes the blocking of clock pulses from clock 175 through indicator 210 through the OR gate 173 present prior to the HANNING CYCLE. After removal of the clearing signal to indicator 210 at the start of the HANNING CYCLE, each clock pulse from clock 175 is routed by indicator 210 and by the Q output through OR gate 173 to advance counter 172 and addresses memory 18. The $\overline{Q}$ output loads memory 18. The counter 172 continues to advance for each cycle of the HANNING CYCLE, providing address signals to the process memory unit 18 and the Hanning function generator 26 until the comparator 170 detects that a data sample of equal length to the Hanning window has been multiplied by the Hanning function from generator 26.

At this time, the counter 172 is reset by the oneshot 204, and the HANNING CYCLE indicator 162 is reset through an AND gate 212 and the OR gate 164, indicating completion of the Hanning cycle. The $\overline{Q}$ output of the Hanning cycle indicator 164 is connected to the clock input of the FOURIER TRANSFORM indicator register 52 in the comparison and control unit 50 (FIG. 6) and a reset of the HANNING CYCLE indicator 162 cause the indicator 52 to be activated, indicating start of the first cycle, $P_0$ of the comparison and control unit 50, the operation of which is set forth above.

Output of the indicator 52 is also provided at a LOAD input of the counter 186 (FIG. 8A), causing the contents of the counter 208, representing the number of Hanning cycles, to be transferred into the counter 186 for comparison with the contents of the counter 182, representing the number of data words in the data to be processed. The output of the register 52 during the first cycle $P_0$ is also provided through an OR gate 214 (FIG. 8) to energize a STEP 1 cycle indicator register 216, indicating the first step of the Fourier transform cycle, multiplication and addition in the multiplier 24 and adder 38 of the Hanned data in memory 18 by the sine function from the generator 34, is to be performed.

The counter 172 is advanced by one through the OR gate 173 and an AND gate 218 (FIG. 8A) for each word during STEP 1 of the Fourier transform cycle, and the output of counter 172 provided as an address signal to memory 18 and function generator 34. Advancing the contents of counter 172 (FIG. 8) with clock pulses in this manner continues until the comparator 170 detects that each data word has been multiplied, at which time the one-shot 204 resets counter 172 clearing the STEP 1 indicator 216 through an AND gate 220 and an OR gate 222, energizing a STEP 2 cycle indicator 224. The indicator 224 when energized indicates that the second step of the Fourier transform cycle, multiplication of the Hanned data window in memory 18 by the cosine function from the generator 42, is to be performed.

The counter 172 is advanced by one through the OR gate 173 and an AND gate 230 for each multiplication operation in the STEP 2 of the Fourier transform cycle and the output of counter 172 provided as an address signal to memory 18 and function generator 42. Advancing the contents of counter 172 in this manner continues until comparator 170 again detects that each data word have been multiplied, at which time counter 172 is reset through one-shot 204 and STEP 2 indicator 224 is reset through the gates 226 and 228, energizing a STEP 3 indicator 232.

STEP 3 indicator 232, when energized, indicates that the third step of the Fourier transform cycle, multiplication of the contents of the buffer 38 by itself through switches 22 and 30 in the multiplier 24 is to take place. The output of STEP 3 indicator 232 indicator energizes these circuits of the calculator C during the third step of the Fourier transform cycle. A clock pulse from AND gate 219 and OR gate 173 loads buffer 38 with the result of STEP 3. The same clock pulse resets STEP 3 indicator through AND gate 236 and OR gate 234. The transition of STEP 3 indicator to its $\overline{Q}$ side will energize STEP 4 indicator 238. STEP 4 indicates that the fourth step of the Fourier transformation cycle, squaring the contents of the buffer 46 in the multiplier 24, summing the squared products so formed with the contents of the buffer 38 in adder 36 and storing it in buffer 38 is to be performed. The output of STEP 4 indicator 238 energizes these circuits of the calculator C during the fourth step of the Fourier transform cycle. A clock pulse from AND gate 221 and OR gate 173 loads buffer 38 with the result of STEP 4. By the same clock pulse, indicator 238 is reset through an AND gate 240 and an OR gate 242, indicating completion of the fourth step of the Fourier transform cycle.

At the end of the first cycle $P_0$ of the comparison and control unit 50, the P counter 60 is advanced one count through a synchronization control circuit 244 (FIG. 7) whose function is to co-ordinate operating cycles of the cycle controller 14 and comparator and control unit 50. An indicator 246 is set to a logic "1" by the t counter 58 at the end of time interval $t_9$ of each operating cycle P of the control unit 50, as indicated by an inverted $t_9$ signal from an inverter 247, and an indicator 248 is set to a logic "1" by the output of STEP 4 indicator 238 (FIG. 8) at the end of the fourth step of the cycle controller 14.

An AND gate 250 is connected to the outputs of indicators 246 and 248 to prevent advancing the P counter 58 until both the present Fourier transform function $A_{f_i}^2$ for the next comparison cycle has been obtained under control of cycle controller 14, and the present ocmparison cycle in unit 50 has been performed. When both operations are performed the Q output of indicators 246 and 248, will enable AND gate 250 to form an ADVANCE P COUNT pulse to advance the P counter 58 to begin a new comparison cycle in the unit 50, to clear indicators 246 and 248 and to serve as a clock pulse to STEP 1 indicator 216 (FIG. 8) through OR gate 214, beginning the first step of the next Fourier transform cycle under control of cycle controller 14.

For each operating cycle $P_i$, the STEP 1 indicator 216 is enabled through the OR gate 214 by the ADVANCE P COUNTER signal, and a new Fourier transform cycle for the newly incremented frequency value provided to generators 34 and 42 from adder 79 in control unit 50 is performed. The amplitude function $A_{f_i}^2$ so obtained is then transferred in the next cycle $P_{i+1}$ to the buffer 85 (FIG. 6) in unit 50, where such function is compared and processed until the peak frequency $f_r$ and the half-power frequencies $f_1$ and $f_2$ determined in the unit 50, in the manner set forth above. At such time, as has been set forth above, the indicator 52 is cleared, providing a signal to the AND gate 194, again energizing the MEMORY 1 indicator 158, beginning the transfer of another data word, of length corresponding to the Hanning function, from the memory unit 12 through the switch 16 to the memory unit 18.

The cycle control unit 14 continues to control operation of the calculator C for each data window stored in the main memory 12, advancing the counter 208 (FIG. 8A) during the Hanning cycle and transferring such count to counter 186 during the beginning of each Fourier transform cycle P in comparison unit 50 until a comparator 252 determines that the contents of the counter 186, representing the number of data windows processed plus the width of one Hanning function, equals the contents of counter 182 or number of words in the main memory, indicating that all the data has been processed. At this time, the comparator 252 forms an output signal clearing the START indicator 176 (FIG. 8) through an AND gate 254, and providing a logic "1" from indicator 176 to an END indicator 256. On completion of the comparison cycle in comparison unit 50, the $\overline{Q}$ output of indicator 52 in the comparison control unit 50 is energized, transferring the signal from indicator 176 to provide an output signal indicating that the data have been processed and are available for transfer through a suitable buffer 258 (FIG. 5) to a conventional display apparatus 260 for formation of a display of the type shown in FIG. 4.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit of the invention.

We claim:

1. A calculator for processing seismic data to obtain alpha values for subsurface earth layers, comprising:
    (a) means for obtaining a measure of the frequency-amplitude spectrum for a seismic trace in the seismic data;
    (b) means for determining half-power frequencies of the frequency-amplitude spectrum measure;
    (c) means for obtaining the alpha value from the half-power frequencies; and
    (d) means for forming an output record of the alpha values obtained.

2. The calculator of claim 1, wherein:
    (a) said means for obtaining a measure comprises means for obtaining a measure of the frequency-amplitude spectrum for each seismic trace in the seismic data;
    (b) said means for determining comprises means for determining half-power frequencies of each frequency-amplitude spectrum measure; and
    (c) said means for obtaining the alpha value comprises means for obtaining the alpha value from the half-power frequencies in the seismic data.

3. The calculator of claim 1, wherein:

(a) said means for obtaining a measure comprises means for obtaining a measure of the frequency-amplitude spectrum for successive time intervals of the seismic trace in the seismic data;

(b) said means for determining comprises means for determining half-power frequencies of each frequency-amplitude spectrum measure for each successive time interval; and (c) said means for obtaining the alpha value comprises means for obtaining the alpha value from the half-power frequencies in the seismic data for each successive time interval.

4. The calculator of claim 3, wherein the length of the successive time intervals is an integer multiple of the period of a signal having a frequency equal to an observed dominant frequency in the data.

5. The calculator of claim 1, wherein said means for obtaining a measure of the frequency-amplitude spectrum comprises:
means for multiplying portions of the seismic trace with a Hanning function.

6. The calculator of claim 1, wherein said means for obtaining the alpha value includes:
determining the difference between the half-power frequencies.

7. The calculator of claim 1, wherein said means for determining half-power frequencies comprises:
(a) means for determining the peak amplitude in the frequency-amplitude spectrum;
(b) means for determining the frequency at which the peak amplitude in the frequency-amplitude spectrum occurs;
(c) means for halving the peak amplitude;
(d) means for comparing the amplitudes of other frequencies in the frequency-amplitude spectrum with the halved peak amplitude until an equality is obtained; and
(e) means for designating the frequency at which the equality is obtained as a half-power frequency.

8. The calculator of claim 1, wherein said means for obtaining a measure of the frequency-amplitude spectrum comprises:
(a) means for multiplying the seismic data with a shaping function to form the product thereof;
(b) means for forming a signal representing the result of performing a Fourier transformation at a designated frequency in the frequency-amplitude spectrum on the product formed in said means for multiplying.

9. The calculator of claim 8, wherein the shaping function is a Hanning function.

10. The calculator of claim 8, further including:
(a) first storage means for storing the Fourier transform signal formed in said means for forming; and
(b) means for incrementing the designated frequency provided to said means for forming.

11. The calculator of claim 10, wherein said means for forming forms a Fourier transform signal for the incremented frequency and further including:
(a) second storage means for storing the Fourier transform signal for the incremented frequency; and
(b) means for comparing the contents of said first and second storage means.

12. The calculator of claim 11, wherein said means for incrementing increments of the designated frequency for successive frequencies and said means for forming forms a Fourier transform signal for the successive frequencies, and wherein:
(a) said first storage means comprises means for storing the Fourier transform signal for the previous frequency; and
(b) said second storage means comprises means for storing the Fourier transform signal for the present frequency.

13. The calculator of claim 11, wherein said means for comparing comprises:
means for indicating when the contents of said first storage means equal or exceed the contents of said second storage means.

14. The calculator of claim 13, further including:
(a) counter means for counting the increments in frequency from said means for incrementing;
(b) means for summing the count in said counter means and the designated frequency provided said means for forming; and
(c) peak frequency register means, responsive to said means for indicating, for storing the contents of said means for summing as the peak frequency in the frequency-amplitude spectrum.

15. The calculator of claim 14, further including means responsive to said means for indicating, comprising:
means for halving the contents of said first storage means and returning the halved contents to said first storage means.

16. The calculator of claim 15, wherein said means for incrementing continues to increment the designated frequency for successive frequencies and said means for forming forms a Fourier transform signal for the successive frequencies after operation of said peak frequency register means, and wherein:
(a) said first storage means comprises means for storing the Fourier transform signal for the previous frequency; and
(b) said second storage means comprises means for storing the Fourier transform signal for the present frequency.

17. The calculator of claim 16, wherein said means for determining half-power frequencies includes:
upper half-power register means, responsive to said means for indicating and to the operation of said peak frequency register means, for storing the contents of said means for summing as the upper half-power frequency in the frequency-amplitude spectrum.

18. The calculator of claim 15, wherein said means for incrementing continues to increment the designated frequency for successive frequencies and said means for forming forms a Fourier transform signal for the successive frequencies after operation of said upper half-power register means, and wherein:
(a) said first storage means comprises means for storing the Fourier transform signal for the previous frequency;
(b) said second storage means comprises means for storing the Fourier transform signal for the present frequency; and
(c) said means for incrementing thereafter advances the successive frequencies by negative amounts.

19. The calculator of claim 16, wherein said means for determining half-power frequencies includes:
lower half-power register means, responsive to said means for indicating and to the operation of said upper half-power frequency register means, for storing the contents of said means for summing as the lower half-power frequency in the frequency-amplitude spectrum.

20. A calculator for processing seismic data to obtain an indication of subsurface lithology based on the frequency-amplitude characteristics of the seismic data comprising:

(a) means for measuring the frequency-amplitude spectrum for a seismic trade in the seismic data;

(b) means for determining the half-power frequencies of the frequency-amplitude spectrum measure;

(c) means for obtaining said lithology indications from the half-power frequencies; and (d) means for forming an output record of the lithology indication obtained.

21. The calculator of claim 20, wherein the parameter is the bandwidth information of seismic data which have modelled as a collection of damped oscillations from resonating layers of subsurface lithology in response to a seismic input.

* * * * *